July 24, 1923.
M. A. MARQUETTE
TIRE BEAD AND METHOD OF MAKING THE SAME
Original Filed July 6, 1920
1,462,517
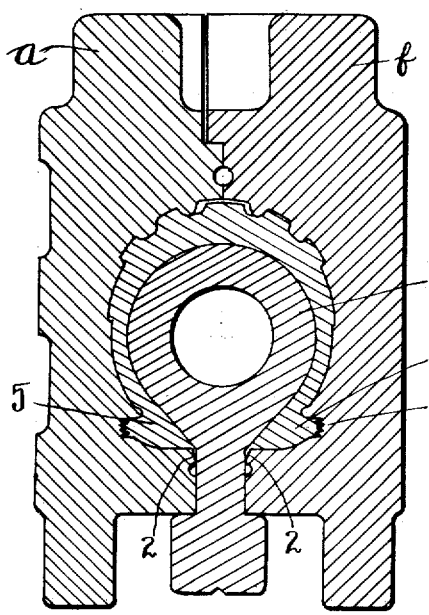
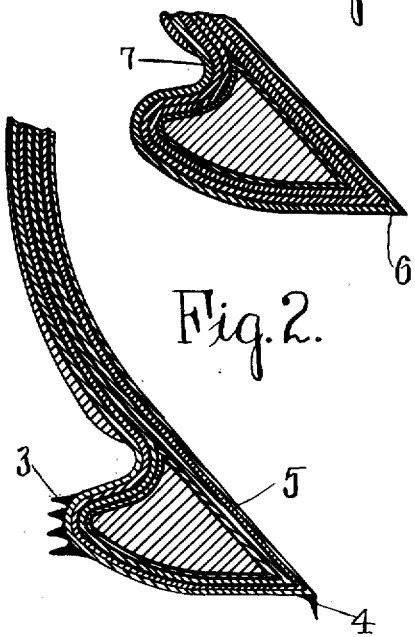
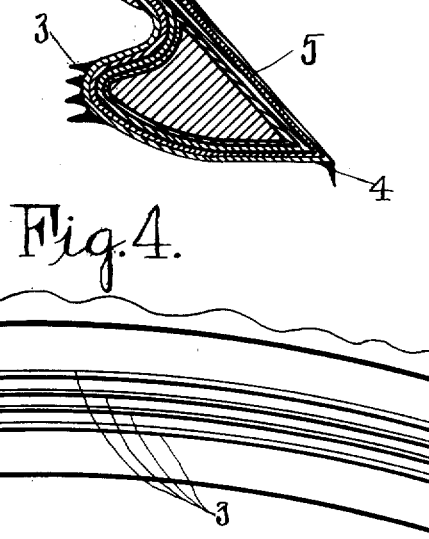
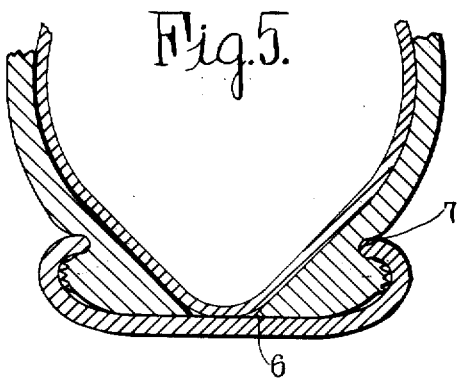
INVENTOR
Melvon A. Marquette.
BY
ATTORNEY Patented July 24, 1923.

1,462,517

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE BEAD AND METHOD OF MAKING THE SAME.

Application filed July 6, 1920, Serial No. 394,230. Renewed January 9, 1923.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Tire Beads and Methods of Making the Same, of which the following is a specification.

This invention relates to the manufacture of tire casings for pneumatic tires and particularly to the manufacture and construction of the base edges or bead portions of such casings. While the invention may be applicable to bead construction of various types it is of particular advantage as applied to clincher beads.

In clincher bead construction it is desirable to have a hard bead. The bead must nevertheless be capable of application to a clincher rim by stretching over the edge of the rim. After it is in place the harder it is the better it will function.

The object of this invention is to increase the hardness of the bead construction during the manufacture of the casing and to do this without extra labor or the expense of special material for the purpose. More specifically, the object is to harden the bead by extruding sufficient rubber from the fabric or cord which is laid around the bead in the manufacture of the tire casing so as to leave the fabric or cord extending from the side walls over the bottom area of the bead with so much less rubber than the fabric or cord normally carries in the side walls that the bead is hardened by pressure during vulcanization as desired. Another object is to provide a tire construction having hardened beads such as result from the manufacturing method. Other objects will appear in the description and claims.

Fig. 1 is cross-section of a mold with a clincher tire mounted therein in the manner usual for vulcanization under pressure but with grooves in the mold adjacent the bead to receive the extruded rubber;

Fig. 2 is a partial section of a clincher tire bead indicating the invention;

Fig. 3 is a like view of an ordinary clincher tire bead;

Fig. 4 is a partial side view of the tire similar to that shown in Fig. 2; and

Fig. 5 is a partial cross section of a clincher tire of my improved construction applied to a clincher rim.

It is customary to give the fabric or cord built into the carcass of a tire a sufficient coating of rubber to attain so far as possible a rubber to rubber contact between the laminations of the carcass and the separate cords of each lamination. This is particularly important in the side walls and across the tread in order to prevent the working of cord against cord. At the bead, however, it is important to have the material hardened for a hard bead will best hold its proper position on the rim. The rubber coated fabric or cords composing the side walls are continued around the bead for anchorage. Because of this fact the bead edge is not as hard as desired and in the attempt to make it hard it has been customary to provide for rigid mold pressure against the bead during vulcanization. This pressure, however, does not give all the desired results because the rubber resists the pressure and remains in the bead when finished.

According to my invention, I provide in the mold suitable spaces adjacent both the toe and the heel of the bead edges, said spaces being provided to receive the rubber extrusions which the molding pressure can force out of the fabric or cord during vulcanization. By this means and by the fact that the bead is subjected to great pressure during valcanization sufficient rubber is extruded from the bead to make it substantially harder than it otherwise would be.

Referring to the drawings I can carry out my invention in one convenient way by providing circumferential recesses 1 in each half of the mold *a* and *b* so as to lie adjacent the heel of the tire bead 5. Adjacent the toe of the bead I provide a circumferential recess 2 between each mold half *a* and *b* and the core *c*.

The carcass of the tire may be built up of cord or fabric of properly coated laminations the edge portions of which are laid around the bead filler member in the usual way. When the tire is vulcanized under pressure with the parts arranged as in Fig. 1 said pressure will squeeze out sufficient rubber from the cord or fabric of the bead edge to make said edge much harder than if the rubber were left in. This extrusion of the rubber is made possible by the provision of recesses 1 and 2 arranged respectively at the heel and toe of the bead cavities, and adapted to receive the extruded rubber.

The extruded rubber will appear as circumferential ridges 3 and 4 (Figures 2 and 4) on the surface of the bead. The cord or fabric from which such rubber has been squeezed will vulcanize into the desired hard fabric covering for the bead. The ridges or lips 4 at the toe of the bead are usually trimmed off and the ridges 3 may be likewise trimmed to give the bead the usual appearance as in Fig. 3. The ridges at the heel may, however, be left on as there is space in the usual clincher rim (see Fig. 5) to accommodate them without harm.

The covering aera of the bead between points 6 and 7 are hardened as desired and without the use of any special material or labor for the purpose. Once the grooves are provided in the mold the invention will be practiced without further labor or attention other than that incident to the ordinary vulcanization process.

While I have described a particular way to carry out my invention it is clear that the mold may be cut or recessed in other ways to permit the extrusion of rubber from the bead area between points 6 and 7 and therefore my invention in this respect resides not in the precise location as described but in the provision of suitable means to extrude sufficient rubber from the cord or fabric between points 6 and 7 (Fig. 5) to accomplish the purpose of hardening the beads in a substantial way over their area.

I claim:

1. A cord or fabric tire casing having bead edges covered by the laminations of its rubber-coated carcass material, said material carrying substantially less rubber coating around the beads than in the side walls and tread of the casing.

2. A tire casing having a body portion composed of laminations of rubber-coated fabric and beads composed of anchoring members enclosed by laminations of rubber-coated fabric, the rubber-content of the second named laminations being less than that of the first-named laminations.

3. In a tire casing a bead construction of rubber and cord or fabric having a hardened covering for the bead comprising the edges of the coated cord or fabric side-wall construction of the casing with a substantial amount of the rubber coating pressed out of the cord or fabric.

4. A tire casing including rubber coated fabric or cord laminations built into the carcass with the edges anchored into and around a bead construction, said laminations having substantially less rubber coating where they extend around the bead construction for engagement with a rim than they have elsewhere in the carcass.

5. A tire casing comprising a complete tire bead construction including anchored laminations of rubber covered cord or fabric extending into the carcass of the casing said laminations carrying substantially less rubber coating in the bead than in the rest of the casing.

6. The method of building tire casings which consists in coating cord or fabric with rubber for the desired carcass construction, anchoring the edges of the carcass construction around the bead fillers, then curing the tire under pressure in a mold and providing means to extrude a substantial amount of rubber from the cord or fabric around the beads during vulcanization to harden the bead construction.

7. The method of constructing tire bead edges which consists in building the bead edges to approximate form from the coated cord or fabric of the tire casing, subjecting the bead edges to pressure during the vulcanization of the casing and providing recesses at different points in the mold to receive rubber extruded from the bead edges under such pressure whereby the bead edge construction is hardened.

8. The method of hardening the bead edges of tire casings which consists in extruding rubber from said edges at different points during the vulcanization of the casing under pressure.

9. The method of hardening the bead edges of tire casings which consists in extruding rubber from the covering area of such edges at the toe and heel portions of the beads during vulcanization of the tire casings.

10. The method of hardening the edges of tire casings built of rubberized fabric or cord which consists in subjecting such edges to pressure during the vulcanization of the casings and providing for the extrusion of rubber from the bead portions under such pressure.

11. The method of hardening the bead edges of tire casings which consists in providing circumferential recesses in the vulcanizing mold adjacent the heels of such edges and pressing the latter during vulcanization so as to force rubber from the edges into such recesses.

12. The method of hardening the bead edges of tire casings which consists in providing circumferential recesses in the vulcanizing mold adjacent the heel and toe portions of such edges and pressing the latter during vulcanization so as to force rubber from the edges into such recesses.

13. The method of vulcanizing a clincher tire casing which consists in applying pressure to the bead portions of the tire so as to squeeze out at the toe and heel of the bead construction excess rubber from the bead covering whereby the bead construction is made harder during vulcanization.

14. The method of vulcanizing clincher tire casings which consists in applying pressure to the casing by a mold adapted to receive at a series of lines extrusions of excess rubber from the bead portions of the casing during the application of such pressure and hardening the surface of the bead for use on a rim.

15. The method of hardening localized portions of a compound fabric and rubber article consisting in extruding rubber from the built-up article at the locality which it is desired to harden.

16. The method of hardening localized portions of a compound fabric and rubber article consisting in vulcanizing the built-up article between molding surfaces provided at the locality which it is desired to harden with means permitting extrusion of rubber.

MELVON A. MARQUETTE.